US011188579B2

(12) United States Patent
Bansal et al.

(10) Patent No.: US 11,188,579 B2
(45) Date of Patent: Nov. 30, 2021

(54) PERSONALIZED DYNAMIC CONTENT VIA CONTENT TAGGING AND TRANSFER LEARNING

(71) Applicant: ADOBE INC., San Jose, CA (US)

(72) Inventors: Dheeraj Bansal, Ghaziabad (IN); Sukriti Verma, Rohini (IN); Pratiksha Agarwal, Rohini (IN); Piyush Gupta, Noida (IN); Nikaash Puri, New Delhi (IN); Vishal Wani, Dublin, CA (US); Balaji Krishnamurthy, Noida (IN)

(73) Assignee: ADOBE INC., San Jose, CA (US)

( * ) Notice: Subject to any disclaimer, the term of this patent is extended or adjusted under 35 U.S.C. 154(b) by 233 days.

(21) Appl. No.: 16/377,424

(22) Filed: Apr. 8, 2019

(65) Prior Publication Data

US 2020/0320112 A1 Oct. 8, 2020

(51) Int. Cl.
| | |
|---|---|
| *G06F 16/00* | (2019.01) |
| *G06F 16/332* | (2019.01) |
| *G06F 16/58* | (2019.01) |
| *G06F 16/535* | (2019.01) |
| *G06N 20/20* | (2019.01) |
| *G06N 3/08* | (2006.01) |

(52) U.S. Cl.
CPC ........ *G06F 16/3326* (2019.01); *G06F 16/535* (2019.01); *G06F 16/5866* (2019.01); *G06N 3/08* (2013.01); *G06N 20/20* (2019.01)

(58) Field of Classification Search
CPC ............. G06F 16/3326; G06F 16/535; G06F 16/5866; G06F 16/45; G06N 20/20; G06N 3/08; G06N 5/003
USPC .................................................. 707/705-780
See application file for complete search history.

(56) References Cited

U.S. PATENT DOCUMENTS

| | | | | |
|---|---|---|---|---|
| 9,159,082 B2* | 10/2015 | Sobotka | ................. | G06F 16/54 |
| 11,004,135 B1* | 5/2021 | Sandler | .................. | G06N 3/08 |
| 2009/0234784 A1* | 9/2009 | Buriano | ................ | H04L 67/306 |
| | | | | 706/12 |
| 2015/0019640 A1* | 1/2015 | Li | ............................. | G06F 3/00 |
| | | | | 709/204 |
| 2016/0103923 A1* | 4/2016 | Thomas | ................ | G06F 40/117 |
| | | | | 715/234 |
| 2017/0132230 A1* | 5/2017 | Muralidhar | ......... | G06F 16/9535 |

* cited by examiner

*Primary Examiner* — Michelle N Owyang
(74) *Attorney, Agent, or Firm* — F. Chau & Associates, LLC

(57) ABSTRACT

Systems and methods are described for serving personalized content using content tagging and transfer learning. The method may include identifying content elements in an experience pool, where each of the content element is associated with one or more attribute tags, identifying a user profile comprising characteristics of a user, generating a set of user-tag affinity vectors based on the user profile and the corresponding attribute tags using a content personalization engine, generating a user-content affinity score based on the set of user-tag affinity vectors, selecting a content element from the plurality of content elements based on the corresponding user-content affinity score, and delivering the selected content element to the user.

16 Claims, 8 Drawing Sheets

PERSONALIZED DYNAMIC CONTENT VIA CONTENT TAGGING AND TRANSFER LEARNING

BACKGROUND

The following relates generally to serving personalized content, and more specifically to serving personalized content using content tagging and transfer learning.

A variety of industries rely on the creation and distribution of multimedia content. For example, the media industry generates content for users to consume, and the advertising industry generates content to inform users about a product and to encourage them to make a purchase. However, with the development and widespread distribution of content creation and telecommunication technologies, more and more multimedia content is being generated by consumers.

User generated content (UGC) is often posted on websites and other social media platforms that specialize in boating and distributing such content. UGC may be any form of content, such as images, videos, text and audio, that has been created and posted by users (e.g., users posting reviews of a product, a service, or an establishment such as a restaurant on an online platform). UGC may be used for a wide range of applications, including problem processing, news, entertainment, advertising, information sharing and research. In some cases, UGC may be created and published without guidance or intervention from traditional gatekeepers such as newspaper editors, publishers and news shows. Some marketers believe that UGC is an important influence that impacts user decisions to buy products and services.

In many cases, it is difficult for those in industry to utilize the vast amount of content being created by users. For example, users may generate content related to a product that could potentially be useful to the maker of the product. However, manually identifying, tagging, and distributing such content could be very costly and inefficient. In addition, many systems that automate this process are incapable of accommodating a dynamic and rapidly changing pool of content. This may result in the need for frequent inefficient updates and/or 'cold start' issues that result in lost time and money.

SUMMARY

A method for serving personalized content using content tagging and transfer learning is described. The method may include identifying a plurality of content elements in an experience pool, wherein each of the plurality of content elements is associated with one or more attribute tags, identifying a user profile comprising a plurality of characteristics of a user, generating, for each of the plurality of content elements, a set of user-tag affinity vectors based on the user profile and the one or more corresponding attribute tags using a content personalization engine, generating, for each of the plurality of content elements, a user-content affinity score based on the set of user-tag affinity vectors, selecting a content element from the plurality of content elements based on the corresponding user-content affinity score, and delivering the selected content element to the user.

An apparatus for serving personalized content using content tagging and transfer learning is described. The apparatus may include a processor, memory in electronic communication with the processor, and instructions stored in the memory. The instructions may be operable to cause the processor to train a content personalization engine using a training set comprising a plurality of model inputs and a plurality of model targets based on user feedback for the model inputs; generate, for each of a plurality of content elements, a set of user-tag affinity vectors based on a user profile and the one or more corresponding attribute tags using the content personalization engine; generate, for each of the plurality of content elements, a user-content affinity score based on the set of user-tag affinity vectors; and select a content element from the plurality of content elements based on the corresponding user-content affinity score.

A non-transitory computer readable medium storing code for serving personalized content using a content personalization engine is described. In some examples, the code comprises instructions executable by a processor to: retrieve a plurality of content elements including user generated content (UGC) from a social media site; associate each of the plurality of content elements with one or more attribute tags, wherein the one or more attribute tags comprises at least one unseen tag that was not used in training a content personalization engine; generate, for each of the plurality of content elements, a set of user-tag affinity vectors based on the one or more corresponding attribute tags; generate, for each of the plurality of content elements, a user-content affinity score based on the set of user-tag affinity vectors; and select a content element from the plurality of content elements based on the corresponding user-content affinity score.

DETAILED DESCRIPTION

Figure 1:
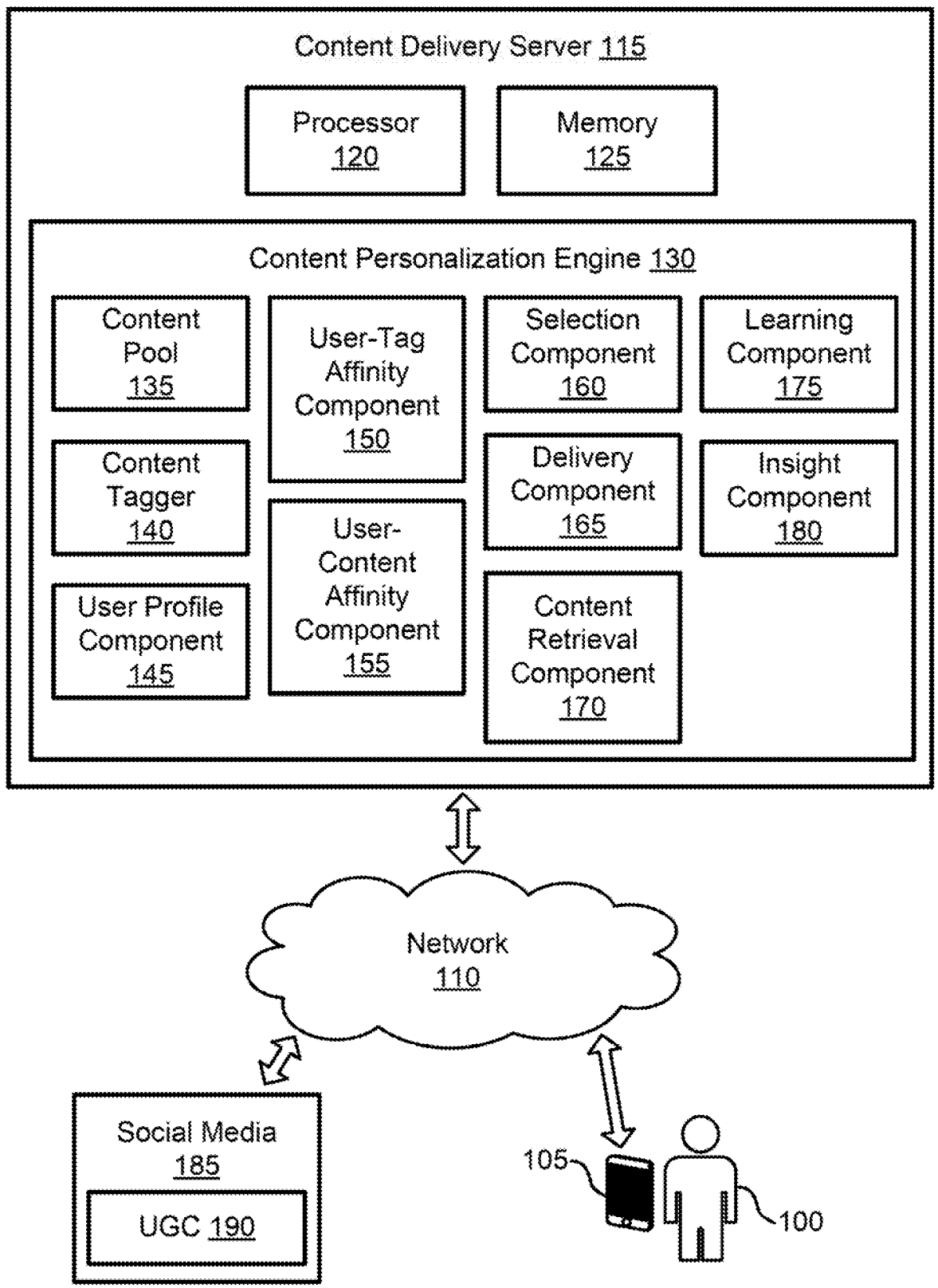
FIG. 1 shows an example of a content personalization system in accordance with aspects of the present disclosure.

The present disclosure relates to systems and methods for personalizing dynamically changing content and serving the personalized content to users. With the growth availability of enabling technologies, user content creation and distribution through social media and other channels from users at large is on an exponential growth trajectory. The pace with which user generated content (UGC) is produced presents an opportunity for marketers to capture and tag the UGC for personalization and make targeted recommendations to product purchasers. For example, use of UGC such as product reviews, likes and dislikes increases user engagement and influence product purchasers' decisions and may yield increased conversions and revenue, but it also poses a number of challenges. For example, it is difficult to sift through the vast amount of content being created and serve it to the appropriate end user in a personalized manner. For example, it may be difficult for personalization engines that are built on sets of unique identifiers, assigned one to each corresponding experience in a pool, to quickly associate the content across experiences. Slowness and cold start issues in these engines will likely occur whenever the pool is updated with any new content.

The present disclosure describes systems and methods for serving personalized content to users based on UGC and other dynamic sources of content. Some embodiments of the present disclosure include gathering UGC (and other dynamic content), tagging the content, generating user-tag affinity scores that estimate the impact each tag may have on a particular user, combing the user-tag affinity scores to generate an overall user-content affinity score, selecting a content element that will have the desired impact on the user based on the user-content affinity scores, and presenting the selected content element to the user (e.g. personalizing the content element in near real time).

At least one embodiment of the present disclosure includes machine learning models that are capable of learning across content from a rapidly changing pool of content (e.g., UGC). Learning across content lead to better accuracy, and hence, better user engagement (and better revenue conversion for advertisers). The systems and methods described may include a content personalization engine that correlates content across a dynamic pool of multimedia content (or experiences) through a transfer learning approach that personalizes UGC in near real-time. Some embodiments of the present disclosure provide recommended content based on user profile that includes demographic information about a user such as age, gender, and location as well as preferences and observed behavior.

The systems and methods described herein may provide the capability to tap into UGC acquired from social media platforms to create personalized content (such as marketing offers), continuously serving content from a changing content pool without having to re-train the model on the new content, saving valuable time and money for the marketers. Embodiments of the present disclosure also provide insights into user segments with different content attribute affinities, which can be leveraged in other marketing solutions.

In conjunction with the user profile attributes, content attributes set through a custom content tagger may be used to train the content personalization engine. This enables the model to correlate content based on a user affinity for specific content attributes, which in turn enables the system to make better and faster decisions. Furthermore, the system may personalize content in near real-time, even if the content has not been previously encountered. This may also enable the system to leverage UGC acquired, for example, from social media platforms to create personalized offers, which may be updated frequently to serve the latest and best experience to the user from a rapidly changing content pool. The systems and methods described may also enable correlation of existing offers at a more granular level, providing deeper insights into the newly discovered market segments. Insights generated by the system may be utilized by other systems, for example, to improve a marketing campaign.

In one embodiment of the present disclosure, an auto-tagger generates a set of tags from a content element. Each tag may be associated with a confidence level. Each tag may be represented in a word vector space, and the resulting word vector may be used as input into a content personalization engine along with a set of user attributes (i.e., characteristics of the user who will view the content). A user-tag affinity score may be generated for each tag associated with the content element, and then the user-tag affinity scores may be combined to form a single user-content affinity score. The user content affinity score may be compared to the scores of other content elements calculated in a similar manner. The content element with the highest score may be selected and presented to the user (i.e., in an advertising offer). In some cases, the system may gather feedback based on the user's interaction with the selected content element, and the feedback may be used to improve the content personalization engine.

The following terms are used throughout the present disclosure:

The term "user-generated content" (UGC) may refer to content generated by individual users. UGC may be posted on websites and other social media platforms. UGC may take the form of images, videos, text, ideograms, symbols such as like and dislike, and audio.

The term "attribute tags" may be used to refer to words associated with a content element that describe an image or concept present in the content element. For example, if an image shows a dog, the term "dog" may be associated with the content element as an attribute tag.

The term "user-tag affinity" may be used to refer to an intermediate value of a machine learning model that is used to derive a user-content affinity (described below). The user-tag affinity may represent the likelihood that a particular user (with a profile specifying multiple user characteristics) will have a reaction to an attribute tag (either positive or negative). Specifically, it may represent the degree to which the presence of a particular attribute influences the probability that a user will click on an advertisement with an image that includes the attribute. In some embodiments, user-tag affinity values may be combined with other user-tag affinity values to create a combined value (i.e., the user-content affinity) that represents the overall likelihood of a positive user interaction.

The term "user-content affinity" may be used to refer to a value that quantifies the likelihood that a particular user will have a positive reaction to content that includes a set of attribute tags. In some cases, the user-content affinity value may be calculated using multiple user-tag affinity values as input.

FIG. 1 shows an example of a content personalization system in accordance with aspects of the present disclosure. The example shown includes user 100, user device 105, network 110, content delivery server 115, and social media site 185. Social media site 185 may include UGC 190. Content delivery server 115 may include processor 120, memory 125, and content personalization engine 130.

The user 100 may view content (e.g., a marketing offer) on user device 105. The content may be delivered from the content delivery server 115 via the network 110. In some cases, the content delivery server 115 may retrieve the content (e.g., UGC 190) from social media site 185. The content may be personalized (i.e., selected from a content pool 135) based on characteristics of the user 100 and attributes of the content to make a compelling experience for the user 100.

Content personalization engine 130 may include content pool 135, content tagger 140, user profile component 145, user-tag affinity component 150, user-content affinity component 155, selection component 160, delivery component 165, content retrieval component 170, learning component 175, and insight component 180. Content personalization engine 130 may be an example of, or include aspects of, the corresponding element or elements described with reference to FIG. 2.

In example embodiments, content personalization engine 130 may include one or more artificial neural networks (ANN). An ANN may be a hardware or a software component that includes a number of connected nodes (a.k.a., artificial neurons), which may be seen as loosely corresponding to the neurons in a human brain. Each connection, or edge, may transmit a signal from one node to another (like the physical synapses in a brain). When a node receives a signal can process it and then transmit the processed signal to other connected nodes.

In some cases, the signals between nodes comprise real numbers, and the output of each node may be computed by a function of the sum of its inputs. Each node and edge may be associated with one or more node weights that determine how the signal is processed and transmitted. During the training process, these weights may be adjusted to improve the accuracy of the result (i.e., by minimizing a loss function which corresponds in some way to the difference between the current result and the target result). The weight of an edge may increase or decrease the strength of the signal transmitted between nodes.

In some cases, nodes may have a threshold below which a signal is not transmitted at all. The nodes may also be aggregated into layers. Different layers may perform different transformations on their inputs. The initial layer may be known as the input layer and the last layer may be known as the output layer. In some cases, signals may traverse certain layers multiple times.

Content tagger 140 may identify multiple content elements in an experience pool (i.e., content pool 135), where each of the content elements is associated with one or more attribute tags. Content tagger 140 may also generate one or more attribute tags for user generated content (UGC) such as UGC 190 using an auto-tagger, where at least one of the one or more attribute tags includes an unseen attribute tag that has not been used to train the content personalization engine 130. Content tagger 140 may also generate a word vector for the unseen tag based at least in part on a word vector space, where one of the set of user 100-tag affinity vectors is based on the word vector. Content tagger 140 may also perform automated image recognition on UGC 190, where the auto-tagger is based at least in part on the automated image recognition.

User profile component 145 may identify a user profile including multiple characteristics of the user 100. For example, the user profile may include user attributes such as age, gender, income, and location, as well as an activity history and/or preference information.

User-tag affinity component 150 may generate, for each of multiple content elements, a set of user-tag affinity vectors based on the user profile and the one or more corresponding attribute tags using content personalization engine 130. User-tag affinity component 150 may be an example of, or include aspects of, the corresponding element or elements described with reference to FIGS. 2 and 3.

User-content affinity component 155 may generate, for each of the content elements, a user-content affinity score based on the set of user-tag affinity vectors. In some examples, the user-content affinity score represents an estimate of a likelihood that the user 100 will have a positive reaction to the selected content element. User-content affinity component 155 may be an example of, or include aspects of, the corresponding element or elements described with reference to FIGS. 2 and 4.

Selection component 160 may select a content element from the content elements based on the corresponding user-content affinity score. In some examples, the content element is selected based on having a highest user-content affinity score among the content elements.

Delivery component 165 may deliver the selected content element to the user 100. In some examples, the selected content element is delivered to the user 100 via a first digital marketing channel. In some examples, an additional content element may be delivered to the user 100 (or another user) via a second digital marketing channel based at least in part on the content personalization engine 130.

Content retrieval component 170 may retrieve content, such as UGC 190, from various sources including the social media site 185. Thus, the content elements in the content pool 135 may include the UGC 190. The social media site 185 is used as an example of a source for UGC 190, but the UGC 190 may be gathered from other sources. Also, content in the content pool 135 may include media elements other than UGC 190. The content in content pool 135 may include images, video, text, and other types of media.

Learning component 175 may receive a training set including multiple model inputs and multiple model targets based on user 100 feedback for the model inputs, where each model input includes a training user 100 profile and one or more training attribute tags. Learning component 175 may also train the content personalization engine 130 based on the training set. Learning component 175 may also update the content personalization engine 130 based on the feedback. In some examples, the content personalization engine 130 is trained based at least in part on a random forest learning model. In other examples, other machine learning models may be used as in addition to, or as an alternative to the random forest model.

Random forests or random decision forests may represent an ensemble learning method for classification, regression and other tasks that operate by constructing a multitude of decision trees at training time and outputting a class that is the mode of the classes (classification) or a mean prediction (regression) of the individual trees. Random decision forests may be used to correct for the potential for decision tree based-models to overfitting a training set. Since the training set used for the content personalization engine 130 (i.e., for the user-tag affinity component 150 and/or the user-content affinity component 155) may result in a deep decision tree, the random forest model may be appropriate to avoid overfitting.

Insight component 180 may generate one or more marketing insights based at least in part on the content personalization engine 130, where the one or more marketing insights include an association between one or more user 100 characteristics and at least one of the one or more attribute tags. The insight component 180 may also represent insights about users that are not limited to marketing. For example, a company could use the insights generated by insight component 180 to improve product function or appearance.

Figure 2:
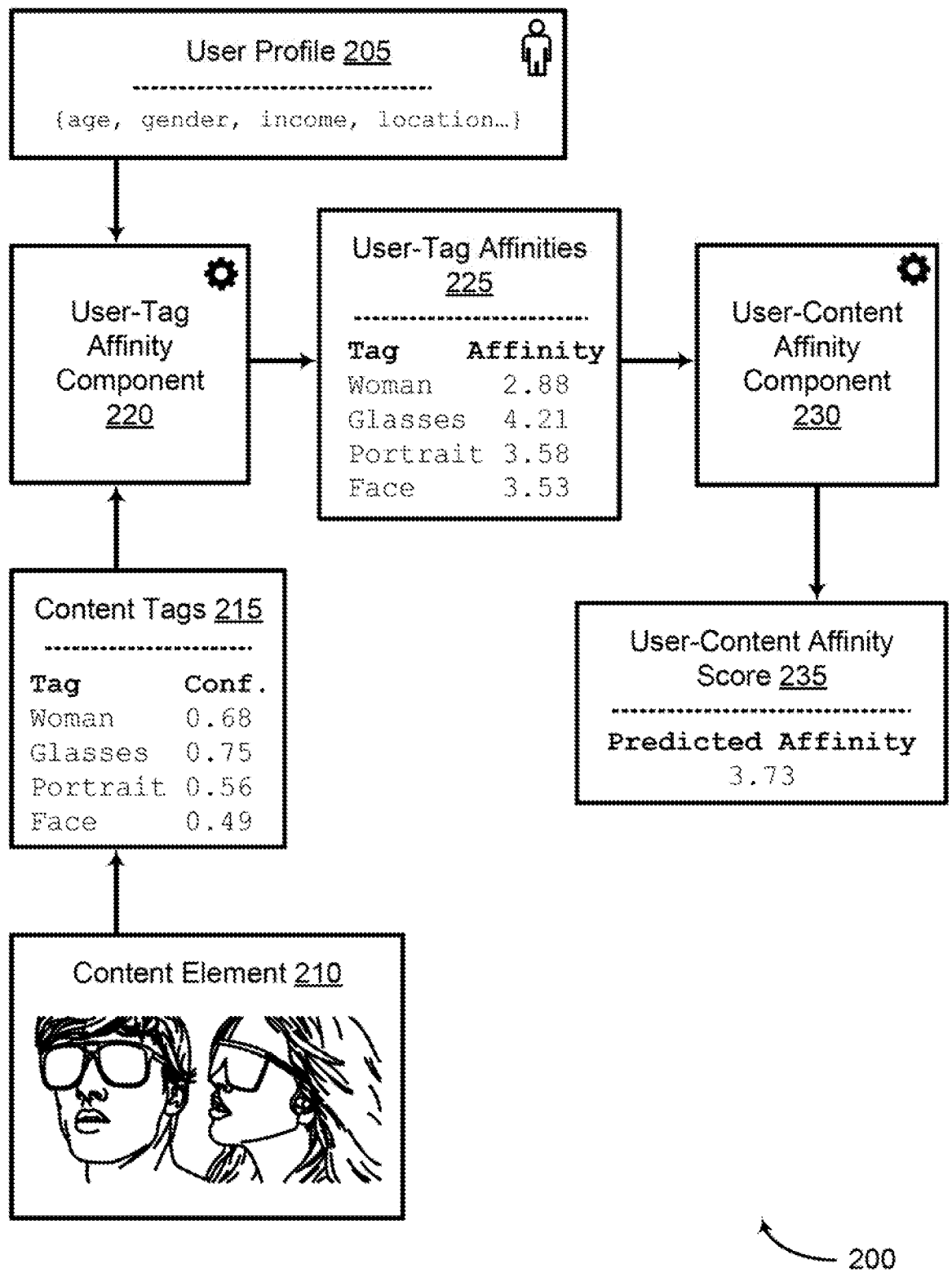
FIG. 2 shows an example of a content personalization engine in accordance with aspects of the present disclosure.

FIG. 2 shows an example of a content personalization engine 200 in accordance with aspects of the present disclosure. Content personalization engine 200 may include user profile 205, content element 210, content tags 215, user-tag affinity component 220, user-tag affinities 225, user-content affinity component 230, and user-content affinity score 235. Content personalization engine 200 may be an example of, or include aspects of, the corresponding element or elements described with reference to FIG. 1.

User profile 205 may include demographic, historical, and preference information about a user. For example, the user profile may include user attributes such as age, gender, income, and location, as well as an activity history and/or preference information. User profile 205 may be an example of, or include aspects of, the corresponding element or elements described with reference to FIG. 3.

Content element 210 may represent an image, text, video, or other media element from a content pool. Content tags 215 may be generated based on the content element 210. For example, based on Content element 210, the Content tags 215 may include "woman", "glasses", "portrait", and "face". The content tags 215 may also be associated with confidence levels representing the likelihood that the image contains a prominent representation of each particular tag. In some cases, content tags 215 may be generated by an auto-tagger, which may be based on a machine learning algorithm. Content tags 215 may be an example of, or include aspects of, the corresponding element or elements described with reference to FIG. 3.

User-tag affinity component 220 may take the user profile 205 and content tags 215 as input and output the user-tag affinities 225. User-tag affinity component 220 may be based on a machine learning algorithm such as a random forest. User-tag affinity component 220 may be an example of, or include aspects of, the corresponding element or elements described with reference to FIGS. 1 and 3.

User-tag affinities 225 represent the likelihood that a user will have an affinity for a given tag from the Content tags 215. In some embodiments, may be an example of, or include aspects of, the corresponding element or elements described with reference to FIGS. 3 and 4.

User-content affinity component 230 may take user-tag affinities 225 as input and output the user-content affinity score 235. User-content affinity component 230 may also be based on a machine learning algorithm such as a random forest. User-content affinity component 230 may be an example of, or include aspects of, the corresponding element or elements described with reference to FIGS. 1 and 4. In some examples, User-tag affinity component 220 may be combined with User-content affinity component 230. However, if there are a large number of parameters in the user profile 205, the content personalization engine 200 may operate more efficiently by determining user-tag affinities 225 for each tag independently, and then combining them at the user-content affinity component 230

User-content affinity score 235 may represent a likelihood (or an estimate of a likelihood) that a user will interact with multimedia including the content element 210. For example, user-content affinity score 235 may represent an estimate of the likelihood that a user will click on a marketing offer that includes content element 210. User-content affinity score 235 may be an example of, or include aspects of, the corresponding element or elements described with reference to FIG. 4.

Figure 3:
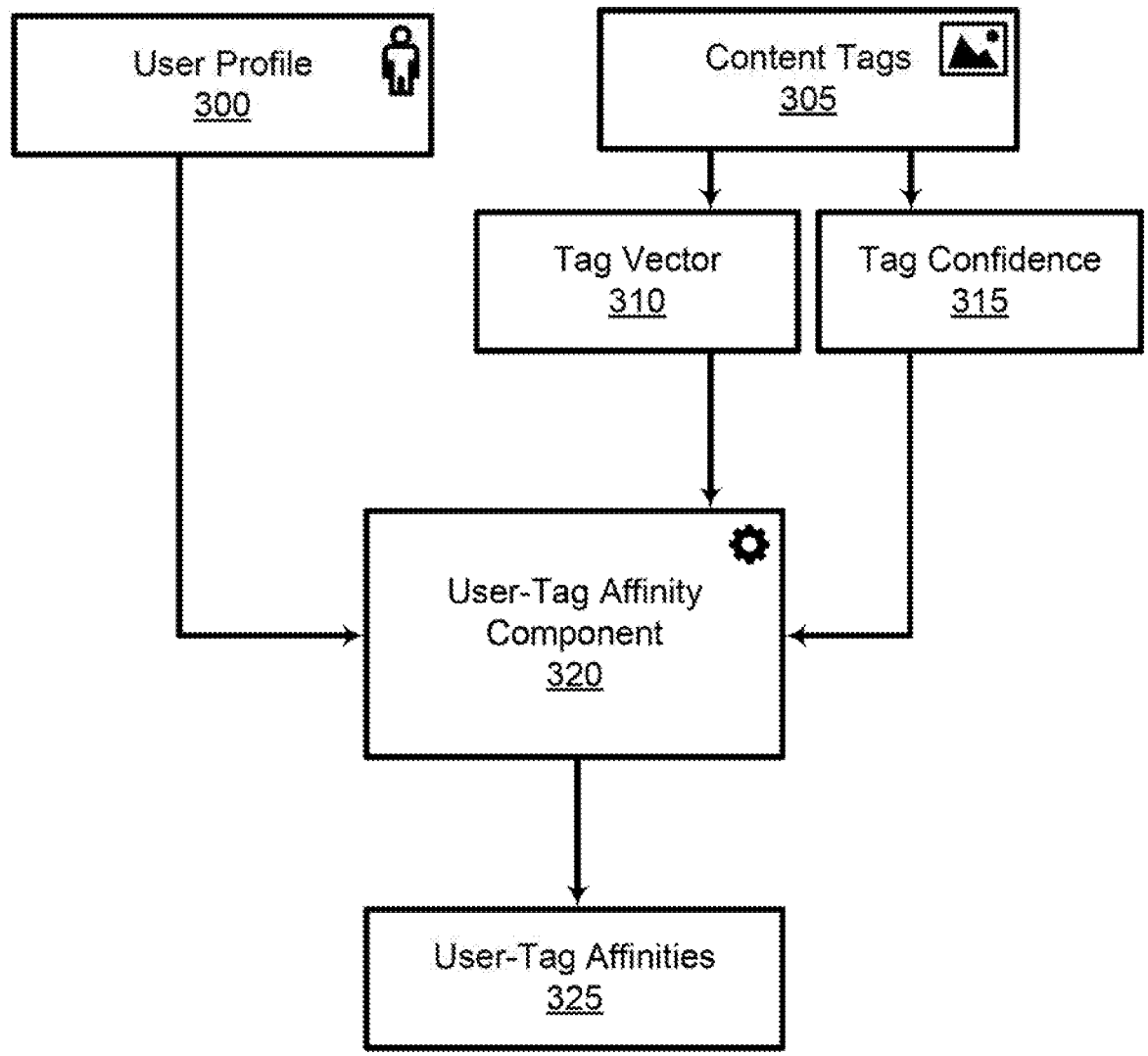
FIG. 3 shows an example of a user-tag affinity component in accordance with aspects of the present disclosure.

FIG. 3 shows an example of a user-tag affinity component 320 in accordance with aspects of the present disclosure. The example shown includes user profile 300, content tags 305, tag vector 310, tag confidence 315, user-tag affinity component 320, and user-tag affinities 325. The user-tag affinity component 320 may take a user profile 300, tag vectors 310, and tag confidence 315 as input and output user-tag affinities 325 (e.g., an affinity score for each tag).

User profile 300 and content tags 305 may be examples of, or include aspects of, the corresponding elements described with reference to FIG. 2. Content tags 305 may be input into a word-to-vector function to produce a tag vector 310 for each tag. The tag vector 310 may be a vector in a word space. By using tag vectors 310 as input for the user-tag affinity component 320 (instead of the content tags 305 themselves), a content personalization engine may be able to generate user-tag affinities 325 for words that were not part of the training set for the user-tag affinity component 320. That is, each tag vector 310 may be represented in a multidimensional space, such that different content tags 305 can be "close" or "far" from each other.

A tag that has not been used in the training of the user-tag affinity component 320 may be referred to as an "unseen" tag. In some cases, UGC may be more likely to include unseen tags since the generation of the UGC is an uncontrolled process. Thus, generating the tag vector 310 may enable the content personalization engine to more effectively evaluate UGC. Using tag vectors 310 in a word vector space may also enable an auto-tagger to be updated independently from user-tag affinity component 320.

User-tag affinity component 320 may be an example of, or include aspects of, the corresponding element or elements described with reference to FIGS. 1 and 2. User-tag affinities 325 may be an example of, or include aspects of, the corresponding element or elements described with reference to FIGS. 2 and 4.

Figure 4:
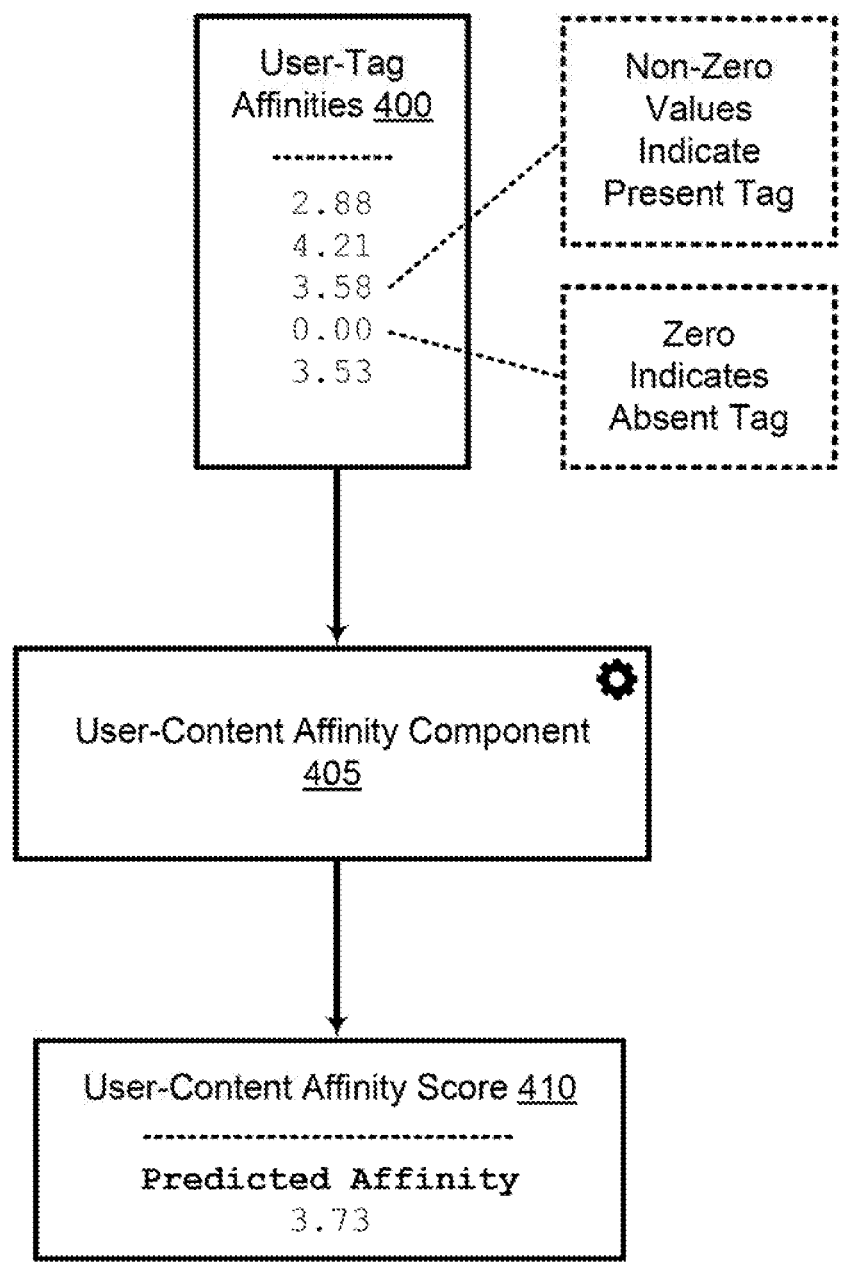
FIG. 4 shows an example of a user-content affinity component in accordance with aspects of the present disclosure.

FIG. 4 shows an example of a user-content affinity component 405 in accordance with aspects of the present disclosure. The example shown includes user-tag affinities 400, user-content affinity component 405, and user-content affinity score 410. The user-content affinity component 405 may take user-tag affinities 400 as input and output user-content affinity score 410, which may be a combination of the user-tag affinities 400, and may represent the likelihood that a user will interact with a particular content element.

User-tag affinities 400 may be an example of, or include aspects of, the corresponding element or elements described with reference to FIGS. 2 and 3. In some cases, the user-tag affinities 400 may include more values than the number of content tags in a content element. For example, non-zero values may be used for tags that are present in the content element being evaluated and zero values may be used as a placeholder for values that are not present.

User-content affinity component 405 may be an example of, or include aspects of, the corresponding element or elements described with reference to FIGS. 1 and 2. User-content affinity score 410 may be an example of, or include aspects of, the corresponding element or elements described with reference to FIG. 2.

Figure 5:
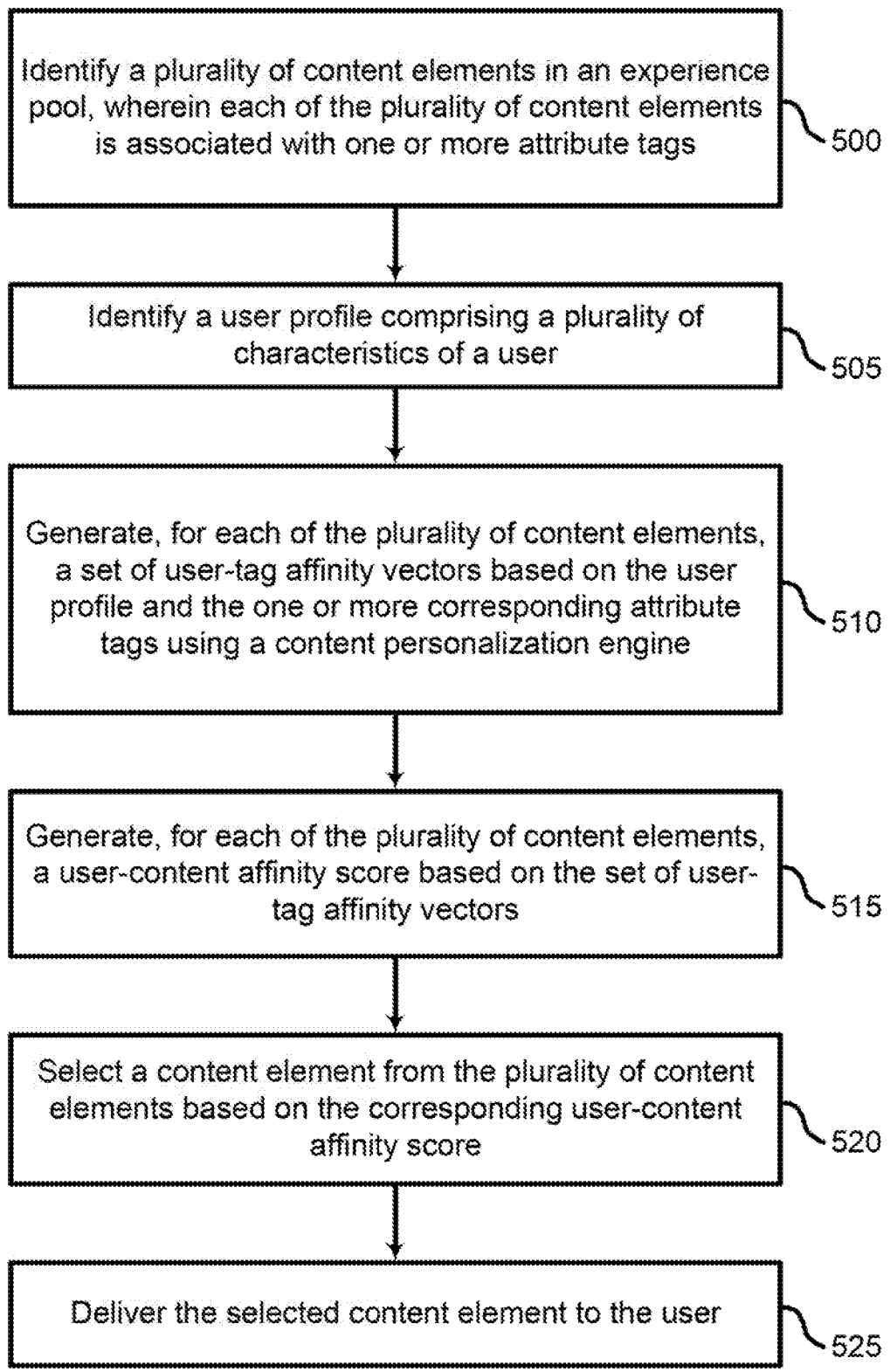
FIG. 5 shows an example of a process for serving personalized content using content tagging and transfer learning in accordance with aspects of the present disclosure.

FIG. 5 shows an example of a process for serving personalized content using content tagging and transfer learning in accordance with aspects of the present disclosure. In some examples, these operations may be performed by a system including a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various sub-steps, or may be performed in conjunction with other operations described herein.

At step 500, the system may identify a plurality of content elements in an experience pool, where each of the plurality of content elements is associated with one or more attribute tags (e.g., by an auto-tagger either in real time, or beforehand). In some cases, the operations of this step may refer to, or be performed by, a content tagger as described with reference to FIG. 1. In some examples, the contents of the experience pool may be gathered automatically from one or more online platforms, social media sites, or wikis.

At step 505, the system may identify a user profile including a plurality of characteristics of a user. The user profile may be obtained based on information provided by a browser, based on the user signing in to a web based application, or in some other suitable manner. In some cases, the operations of this step may refer to, or be performed by, a user profile component as described with reference to FIG. 1.

At step 510, the system may generate, for each of the plurality of content elements, a set of user-tag affinity vectors based on the user profile and the one or more corresponding attribute tags using a content personalization engine. For example, a number of tags may be generated based on an auto-tagger. In some cases, the operations of this step may refer to, or be performed by, a user-tag affinity component as described with reference to FIGS. 1-3.

Automatic image annotation (i.e., auto-tagging) may be performed via a process by which an automated system assigns metadata to a digital image (i.e., in the form of captioning or keywords). An auto-tagger may represent a type of image classification with a large number of classes corresponding to the set of possible image tags. In some cases the image analysis may produce an extracted feature (or tag) vectors. The auto-tagger may be a machine learning system that is trained using a set of input images that have a predetermined set of tags. After training the system on the training set, subsequent images may be categorized based on the model determined during the training process.

After the auto-tagger creates a set of content tags (each of which may be associated with a likelihood or weighting factor), each of the tags may be input into another machine learning model to generate a user-tag affinity score. Each of the user-tag affinity scores may be based on the user profile and one or more of the content tags.

In some cases, the content tags are represented in a vector space so that tags which have not previously been encountered (or used to train the user-tag affinity machine learning model) may still be processed. For example, if an unseen tag is close (in the vector space representation) to one or more tags that have been used to train the model, the resulting affinity may be similar to what it would be for the similar tags. The use of a word vector space may be an alternative to using a fixed high-dimensional tag space (i.e., where each dimension corresponds to a distinct word).

By using a word vector space, the system allows personalization even on dynamically changing content without running into "cold start" issues. Furthermore, the system may learn across content (i.e., learning from existing tags may be applied to unseen tags). Learning across content may be an alternative to approaches that build a machine learning model based on static content. Learning across content may lead to better accuracy, and hence to better user engagement and conversions.

The ability of the system to process unseen tags may be useful for enabling the system to process UGC. For example, since UGC may be generated in an unsupervised manner, the number of potential tags may be large and dynamic. Therefore, a system that can produce meaningful results from unseen tags may be well suited for incorporating UGC into personalized content.

The user-tag affinity machine learning model may be trained using input vectors each of which includes a user profile and one or more tags. A feedback or target parameter may also be associated with input vector, and may represent whether or not the user indicated by the profile had a desired interaction with a content element associated with the one or more tags. In some embodiments a single, tag may be used for each input vector because using multiple tags may necessitate the use of a very large training set. In some examples, the user-tag affinity machine learning model may utilize a random forest model as described above.

At step 515, the system may generate, for each of the plurality of content elements, a user-content affinity score based on the set of user-tag affinity vectors. In some cases, the operations of this step may refer to, or be performed by, a user-content affinity component as described with reference to FIGS. 1, 2, and 4.

In some cases, the user-content score may be generated using a user-content machine learning model. For example, the user-content machine learning model may utilize a random forest regression model to combine the user-tag affinity scores into a single user-content affinity score. The resulting user-content affinity score may represent the likelihood that a user will respond positively to a content element that includes the associated set of content tags. For example, it may represent the likelihood that a user will click on an advertising offer. The user-content affinity machine learning model may be trained using a set of input vectors that include a plurality of user-tag affinity scores and a target vector that represents whether a user interacted with content having the associated content tags.

In some examples, the user-content affinity score may be calculated by an algorithm rather than by a machine learning model. For example, the user-content affinity score may be calculated using a weighted averaging algorithm.

At step 520, the system may select a content element from the plurality of content elements based on the corresponding user-content affinity score. For example, the system may select the content element with the highest user-content affinity score. In some cases, the operations of this step may refer to, or be performed by, a selection component as described with reference to FIG. 1.

At step 525, the system may deliver the selected content element to the user. For example, the system may present the selected content as part of a website, or in an advertising offer. In some cases, the operations of this step may refer to, or be performed by, a delivery component as described with reference to FIG. 1.

Figure 6:
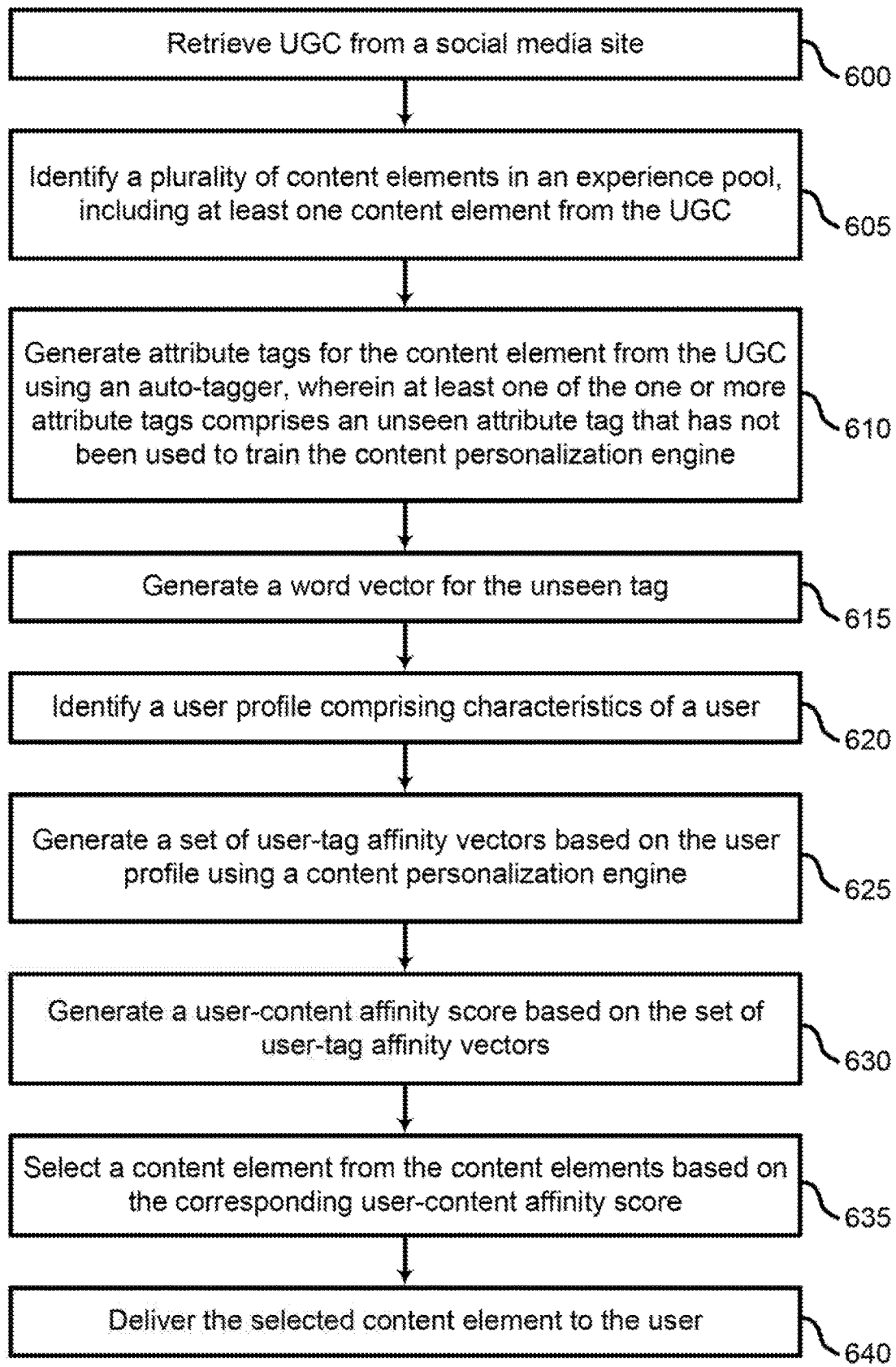
FIG. 6 shows an example of a process for serving personalized content based on user generated content (UGC) in accordance with aspects of the present disclosure.

FIG. 6 shows an example of a process for serving personalized content based on UGC in accordance with aspects of the present disclosure. In some examples, these operations may be performed by a system including a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein. Certain of the steps of FIG. 6 correspond to similar steps from FIG. 5, and description of these steps is limited to avoid redundancy.

At step 600, the system may retrieve UGC from a source such as a social media site. In some cases, the UGC may also be associated with metadata related to user information and user interactions with the UGC. In this case, the UGC may be used to train the user-tag affinity machine learning model. In some cases, the operations of this step may refer to, or be performed by, a content retrieval component as described with reference to FIG. 1.

At step 605, the system may identify a plurality of content elements in an experience pool, where the plurality of content elements includes at least one content element from the UGC. In some cases, the operations of this step may refer to, or be performed by, a content tagger as described with reference to FIG. 1.

The UGC may be posted on websites and other social media platforms that specialize in hosting and distributing such content. The UGC may be any form of content, such as images, videos, text, ideograms, symbols and audio, that has been created and posted by users (e.g., on an online platform). In some cases, the UGC may be created and published without guidance or intervention from traditional gatekeepers such as newspaper editors, publishers and news shows.

At step 610, the system may generate one or more attribute tags for the at least one content element from the UGC using an auto-tagger, where at least one of the one or more attribute tags includes an unseen attribute tag that has not been used to train the content personalization engine. In some cases, the operations of this step may refer to, or be performed by, a content tagger as described with reference to FIG. 1.

At step 615, the system may generate a word vector for the unseen tag (and for other content tags) based at least in part on a word vector space. In some cases, the operations of this step may refer to, or be performed by, a content tagger as described with reference to FIG. 1.

At step 620, the system may identify a user profile including a plurality of characteristics of a user. In some cases, the operations of this step may refer to, or be performed by, a user profile component as described with reference to FIG. 1.

At step 625, the system may generate, for each of the plurality of content elements, a set of user-tag affinity vectors based on the user profile (and the word vector for each tag) using a content personalization engine. In some cases, the operations of this step may refer to, or be performed by, a user-tag affinity component as described with reference to FIGS. 1-3.

At step 630, the system may generate, for each of the plurality of content elements, a user-content affinity score based on the set of user-tag affinity vectors. In some cases, the operations of this step may refer to, or be performed by, a user-content affinity component as described with reference to FIGS. 1, 2, and 4.

At step 635, the system may select a content element from the plurality of content elements based on the corresponding user-content affinity score. In some cases, the operations of this step may refer to, or be performed by, a selection component as described with reference to FIG. 1.

At step 640, the system may deliver the selected content element to the user (e.g., via a marketing offer). In some cases, the operations of this step may refer to, or be performed by, a delivery component as described with reference to FIG. 1.

Figure 7:
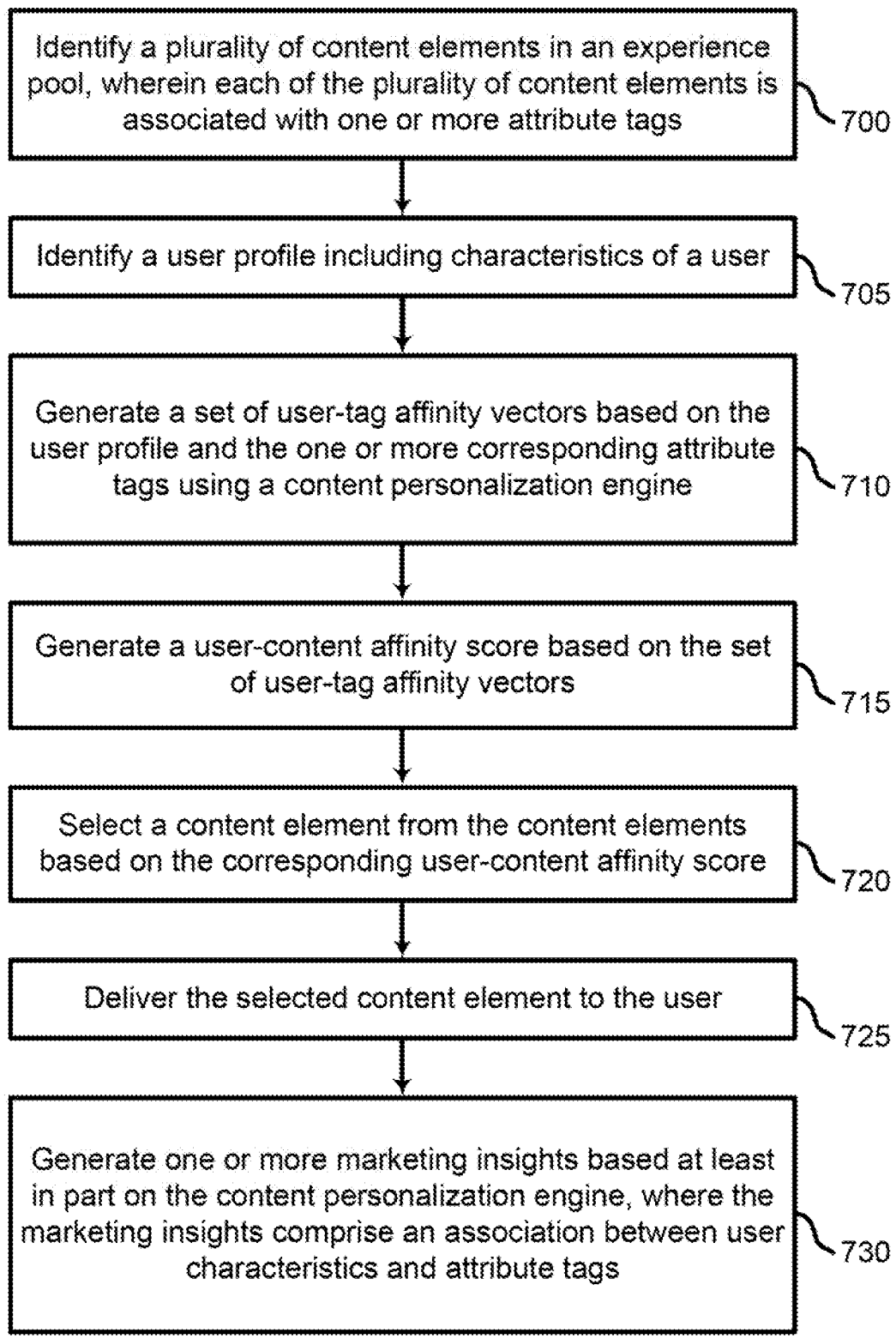
FIG. 7 shows an example of a process for generating market insights in accordance with aspects of the present disclosure.

FIG. 7 shows an example of a process for generating market insights in accordance with aspects of the present disclosure. In some examples, these operations may be performed by a system including a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein. Certain of the steps of FIG. 7 correspond to similar steps from FIG. 5, and description of these steps is limited to avoid redundancy.

At step 700, the system may identify a plurality of content elements in an experience pool, where each of the plurality of content elements is associated with one or more attribute tags. In some cases, the operations of this step may refer to, or be performed by, a content tagger as described with reference to FIG. 1.

At step 705, the system may identify a user profile including a plurality of characteristics of a user. In some cases, the operations of this step may refer to, or be performed by, a user profile component as described with reference to FIG. 1.

At step 710, the system may generate, for each of the plurality of content elements, a set of user-tag affinity vectors based on the user profile and the one or more corresponding attribute tags using a content personalization engine. In some cases, the operations of this step may refer to, or be performed by, a user-tag affinity component as described with reference to FIGS. 1-3.

At step 715, the system may generate, for each of the plurality of content elements, a user-content affinity score based on the set of user-tag affinity vectors. In some cases, the operations of this step may refer to, or be performed by, a user-content affinity component as described with reference to FIGS. 1, 2, and 4.

At step 720, the system may select a content element from the plurality of content elements based on the corresponding user-content affinity score. In some cases, the operations of this step may refer to, or be performed by, a selection component as described with reference to FIG. 1.

At step 725, the system may deliver the selected content element to the user. In some cases, the operations of this step may refer to, or be performed by, a delivery component as described with reference to FIG. 1.

At step 730, the system may generate one or more marketing insights based at least in part on the content personalization engine, where the one or more marketing insights include an association between one or more user characteristics and at least one of the one or more attribute tags. In some cases, the operations of this step may refer to, or be performed by, an insight component as described with reference to FIG. 1.

In some cases, the marketing insights may correspond to rules or guidance that is gleaned from the content personalization engine related to what kinds of content are appealing to users having different demographic profiles. For example, a marketing insight may suggest that male users from urban areas in the Pacific Northwest may prefer images with beards. As another insight, a marketing insight that female users over the age of 65 may prefer text having a blue font. These marketing insights may be used to generated personalized content, but they may also be used as impute for the creation of other marketing or targeting campaigns.

In some examples, the insights into the model through model interpretation may provide mapping of the content affinity with each user profile, which can be used to create advanced audience rules and deliver targeted content to those users via different marketing channels.

Figure 8:
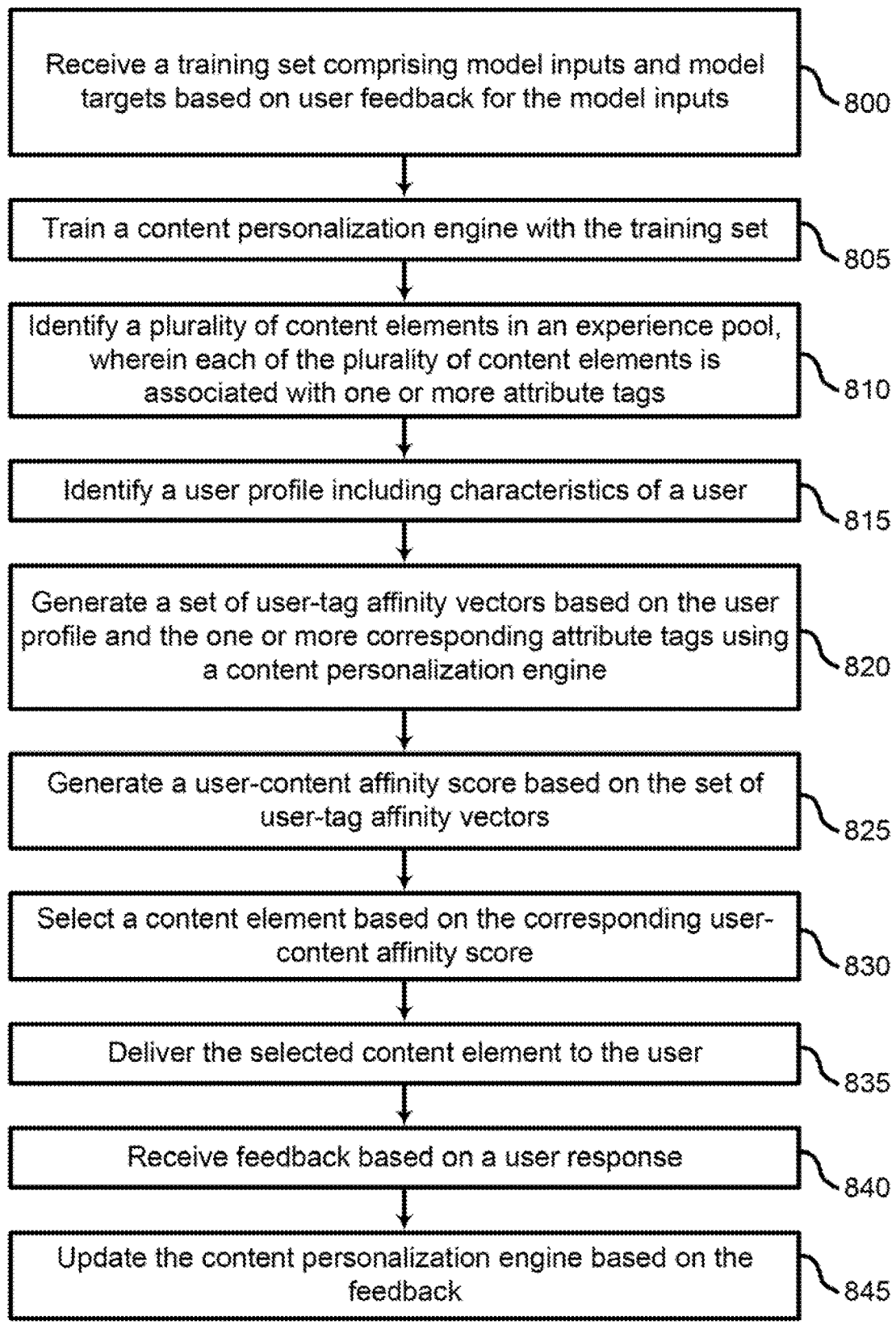
FIG. 8 shows an example of a process for training a content personalization engine in accordance with aspects of the present disclosure.

FIG. 8 shows an example of a process for training a content personalization engine in accordance with aspects of the present disclosure. In some examples, these operations may be performed by a system including a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein. Certain of the steps of FIG. 8 correspond to similar steps from FIG. 5, and description of these steps is limited to avoid redundancy.

At step 800, the system may receive a training set including a plurality of model inputs and a plurality of model targets based on user feedback for the model inputs, where each model input includes a training user profile and one or more training attribute tags. In some cases, the operations of this step may refer to, or be performed by, a learning component as described with reference to FIG. 1.

At step 805, the system may train a content personalization engine based on the training set. In some cases, the operations of this step may refer to, or be performed by, a learning component as described with reference to FIG. 1.

At step 810, the system may identify a plurality of content elements in an experience pool, where each of the plurality of content elements is associated with one or more attribute tags. In some cases, the operations of this step may refer to, or be performed by, a content tagger as described with reference to FIG. 1.

At step 815, the system may identify a user profile including a plurality of characteristics of a user. In some cases, the operations of this step may refer to, or be performed by, a user profile component as described with reference to FIG. 1.

At step 820, the system may generate, for each of the plurality of content elements, a set of user-tag affinity vectors based on the user profile and the one or more corresponding attribute tags using the content personalization engine. In some cases, the operations of this step may refer to, or be performed by, a user-tag affinity component as described with reference to FIGS. 1-3.

At step 825, the system may generate, for each of the plurality of content elements, a user-content affinity score based on the set of user-tag affinity vectors. In some cases, the operations of this step may refer to, or be performed by, a user-content affinity component as described with reference to FIGS. 1, 2, and 4.

At step 830, the system may select a content element from the plurality of content elements based on the corresponding user-content affinity score. In some cases, the operations of this step may refer to, or be performed by, a selection component as described with reference to FIG. 1.

At step 835, the system may deliver the selected content element to the user. In some cases, the operations of this step may refer to, or be performed by, a delivery component as described with reference to FIG. 1.

At step 840, the system may receive feedback based on a user response to the selected content. For example, the feedback may indicate that the user clicked on an advertisement that included the selected content, or that the user read an article that used the content element as a hero banner.

At step 845, the system may update the content personalization engine based on the feedback. In some cases, the operations of this step may refer to, or be performed by, a learning component as described with reference to FIG. 1. For example, the feedback (along with a profile of the user) may be used to generate an input vector and a target for training a machine learning model for determining user-tag affinity scores (or user-content affinity scores).

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on."

What is claimed is:

1. A method for serving personalized content, comprising:
   training a content personalization engine;

identifying a content element for inclusion in an experience pool;
identifying an unseen attribute tag comprising a word that describes an image present in the content element using an auto-tagger by performing automated image recognition on the image, wherein the unseen attribute tag has not been used to train the content personalization engine;
generating a word vector for the unseen attribute tag by embedding the word in a vector space, wherein distance between vectors in the vector space corresponds to semantic similarity between words;
identifying a user profile comprising a plurality of characteristics of a user;
generating, for the content element, a user-tag affinity vector using the user profile and the word vector of the word as input to the content personalization engine without retraining the content personalization engine;
generating a user-content affinity score based on the user-tag affinity vector;
selecting the content element from a plurality of content elements in the experience pool based on the user-content affinity score; and
delivering the selected content element to the user.

2. The method of claim 1, further comprising:
retrieving user generated content (UGC) from a social media site, wherein the plurality of content elements comprise the UGC.

3. The method of claim 1, wherein:
the selected content element is delivered in real time to the user via a first digital marketing channel; and
the method further comprising delivering an additional content element to the user via a second digital marketing channel based at least in part on the content personalization engine.

4. The method of claim 1, further comprising:
receiving a training set comprising a plurality of model inputs and a plurality of model targets based on user feedback for the model inputs, wherein each model input comprises a training user profile and one or more of the training attribute tags, and wherein the training is based on the training set.

5. The method of claim 4, further comprising:
receiving feedback based on a user response to the selected content; and
updating the content personalization engine based on the feedback.

6. The method of claim 4, wherein:
the content personalization engine is trained based at least in part on a random forest learning model.

7. The method of claim 1, further comprising:
generating one or more marketing insights based at least in part on the content personalization engine, wherein the one or more marketing insights comprise an association between one or more user characteristics and the unseen attribute tag.

8. The method of claim 1, wherein:
the user-content affinity score represents an estimate of a likelihood that the user will have a positive reaction to the selected content element.

9. An apparatus for serving personalized content using content tagging and transfer learning, comprising:
a processor and a memory storing instructions and in electronic communication with the processor, the processor being configured to execute the instructions to:
train a content personalization engine using a training set comprising a plurality of model inputs and a plurality of model targets based on user feedback for the model inputs to obtain a trained content personalization engine;
receive a content element including an image;
identify an unseen attribute tag that describes content of the image using an auto-tagger, wherein the unseen attribute tag has not been used to train the content personalization engine;
generate a word vector for the unseen attribute tag by embedding the unseen attribute tag in a vector space, wherein distance between vectors in the vector space corresponds to semantic similarity between words;
generate a set of user-tag affinity vectors based on the unseen attribute tag and the word vector using the trained content personalization engine without retraining the trained content personalization engine;
generate a user-content affinity score based on the set of user-tag affinity vectors; and
select the content element based on the user-content affinity score.

10. The apparatus of claim 9, the processor being further configured to execute the instructions to:
retrieve user generated content (UGC) from a social media site, wherein the content element comprises the UGC.

11. The apparatus of claim 9, wherein:
each model input comprises a training user profile and one or more training attribute tags.

12. The apparatus of claim 9, the processor being further configured to execute the instructions to:
receive feedback based on a user response to the selected content; and
update the content personalization engine based on the feedback.

13. A non-transitory computer readable medium storing code for
serving personalized content using a content personalization engine, the code comprising instructions executable by a processor to:
retrieve user generated content (UGC) including an image from a social media site;
associate the UGC with an unseen attribute tag that describes content of the image using an auto-tagger, wherein the unseen attribute tag was not used in training a trained content personalization engine;
generate a word vector for the unseen attribute tag by embedding the unseen attribute tag in a vector space, wherein distance between vectors in the vector space corresponds to semantic similarity between words;
generate a user-tag affinity vector based on the unseen attribute tag using the trained content personalization engine without retraining the trained content personalization engine;
generate a user-content affinity score based on the user-tag affinity vector; and
select the UGC from a plurality of content elements based on the user-content affinity score.

14. The non-transitory computer readable medium of claim 13, the code further comprising instructions executable by the processor to:
deliver the selected UGC to the user in real time.

15. The non-transitory computer readable medium of claim 13, the code further comprising instructions executable by the processor to:
receive a training set comprising a plurality of model inputs and a plurality of model targets based on user feedback for the model inputs, wherein each model input comprises a training user profile and one or more training attribute tags; and train the content personalization engine based on the training set.

16. The non-transitory computer readable medium of claim 15, the code further comprising instructions executable by the processor to:

receive feedback based on a user response to the selected UGC; and update the content personalization engine based on the feedback.

\* \* \* \* \*